US012416222B2

(12) United States Patent
Nair et al.

(10) Patent No.: US 12,416,222 B2
(45) Date of Patent: Sep. 16, 2025

(54) NON-METALLIC SUBSEA SKID APPARATUS AND METHODS

(71) Applicant: J. RAY MCDERMOTT, S.A., Houston, TX (US)

(72) Inventors: Sajith Nair, Dubai (AE); Manoj Kulshrestha, Dubai (AE); Nawin Singh, Dubai (AE); Johannes Waimer, Dubai (AE); Antonino Ascone Modica, Dubai (AE); Amit Balkrishna Shendre, Abu Dhabi (AE)

(73) Assignee: J. Ray McDermott, S.A., Houston, TX (US)

( * ) Notice: Subject to any disclaimer, the term of this patent is extended or adjusted under 35 U.S.C. 154(b) by 0 days.

(21) Appl. No.: 17/918,150

(22) PCT Filed: Apr. 15, 2021

(86) PCT No.: PCT/US2021/027465
§ 371 (c)(1),
(2) Date: Oct. 11, 2022

(87) PCT Pub. No.: WO2021/211830
PCT Pub. Date: Oct. 21, 2021

(65) Prior Publication Data
US 2023/0135913 A1 May 4, 2023

Related U.S. Application Data

(60) Provisional application No. 63/010,369, filed on Apr. 15, 2020.

(51) Int. Cl.
*E21B 41/08* (2006.01)
*B29C 70/06* (2006.01)
*F16L 1/20* (2006.01)

(52) U.S. Cl.
CPC .............. *E21B 41/08* (2013.01); *B29C 70/06* (2013.01); *F16L 1/20* (2013.01)

(58) Field of Classification Search
CPC ............. F16L 1/20; E21B 41/08; B29C 70/06
See application file for complete search history.

(56) References Cited

U.S. PATENT DOCUMENTS 3,375,856 A * 4/1968 Howard .................... F16L 1/16
248/68.1
4,784,527 A 11/1988 Hunter et al.
(Continued)

FOREIGN PATENT DOCUMENTS

CN 110884170 A * 3/2020 ............. B29C 33/02
EP 3590692 A2 1/2020
(Continued)

OTHER PUBLICATIONS

International Search Report and Written Opinion dated Jun. 21, 2021 for Application No. PCT/US2021/027465.
(Continued)

*Primary Examiner* — Amber R Anderson
*Assistant Examiner* — Stacy N Lawson
(74) *Attorney, Agent, or Firm* — Patterson + Sheridan, LLP (57) ABSTRACT

A subsea skid (100) includes a plurality of skid tubes (101-112), and a plurality of skid joints (130-135) coupled between the plurality of skid tubes (101-112). The plurality of skid tubes (101-112) and the plurality of skid joints (130-135) form a frame. The plurality of skid tubes (101-112) and the plurality of skid joints (130-135) are each formed of a non-metallic material.

14 Claims, 11 Drawing Sheets (56) References Cited

U.S. PATENT DOCUMENTS

| | | | |
|---|---|---|---|
| 8,397,463 B2* | 3/2013 | Allred, III | F16B 11/008 52/696 |
| 8,528,291 B2* | 9/2013 | Allred, III | E04C 3/08 52/81.3 |
| 2006/0201679 A1 | 9/2006 | Williams | |
| 2010/0192506 A1* | 8/2010 | Allred, III | F16B 11/008 403/205 |
| 2015/0337988 A1* | 11/2015 | Huang | F16L 3/08 405/184.4 |
| 2019/0323325 A1* | 10/2019 | Hestetun | E21B 41/08 |
| 2019/0374976 A1 | 12/2019 | Herrington | |
| 2019/0376250 A1 | 12/2019 | Grytdal et al. | |
| 2020/0103051 A1* | 4/2020 | Clunie | E21B 43/017 |
| 2021/0348703 A1* | 11/2021 | Vorley | B23P 19/061 |

FOREIGN PATENT DOCUMENTS

| | | | | | |
|---|---|---|---|---|---|
| GB | 2355034 A | * | 4/2001 | | E02B 17/02 |
| GB | 2440808 A | | 2/2008 | | |
| GB | 2577812 A | | 4/2020 | | |
| JP | 2006289857 A | * | 10/2006 | | B29C 65/00 |
| WO | WO-2016133393 A1 | * | 8/2016 | | B29C 65/485 |
| WO | 2020070476 A1 | | 4/2020 | | |

OTHER PUBLICATIONS

Saudia Arabia Examination Report issued to Patent Application No. 522440918 on Sep. 19, 2023.
A.R.I.P.O. Office Action issued to patent application No. AP/P/2022/014458 on Aug. 16, 2024.
United Arab Emirates Office Action and Search Report dated Oct. 6, 2024 for Application No. P6002128/2022.
Brazil Search Report issued to application No. BR112022020815-4 on Nov. 26, 2024.
Brazil Office Action issued to patent application No. BR112022020815-4 on May 6, 2025.
Notification of Non-Compliance With Substantive Requirements and Invitation To Submit Observations And/Or Amended Application Issued To Patent Application No. AP/P/2022/014458 on May 14, 2025.

* cited by examiner

NON-METALLIC SUBSEA SKID APPARATUS AND METHODS

BACKGROUND

Field

Aspects of the present disclosure relate to non-metallic subsea skid apparatus and associated methods, such as composite subsea valve skid apparatus and methods.

Description of the Related Art

Subsea skids can be affected by subsea conditions. For example, subsea conditions can corrode the subsea skids, which can involve maintenance and/or reduced lifespans for the subsea skids. The subsea skids can be heavy and can also be difficult to access, such as by diving operations. Furthermore, subsea skids can involve carbon footprints and can become snagged on other subsea components.

Therefore, there is a need for subsea skid apparatus and related methods that facilitate increased lifespans, corrosion resistance, reduced weight, anti-snagging capabilities, and reduced carbon footprints.

SUMMARY

Implementations of the present disclosure relate to non-metallic subsea skid apparatus and associated methods, such as composite subsea valve skid apparatus and methods.

In one implementation, a subsea skid includes a plurality of skid tubes, and a plurality of skid joints coupled between the plurality of skid tubes. The plurality of skid tubes and the plurality of skid joints form a frame. The plurality of skid tubes and the plurality of skid joints are each formed of a non-metallic material.

In one implementation, a method of forming a subsea skid includes disposing portions of a plurality of skid tubes in legs of a plurality of skid joints to arrange the plurality of skid tubes and the plurality of skid joints as a frame. Each of the plurality of skid joints and the plurality of skid tubes is formed of a non-metallic material. The method includes curing the portions of the plurality of skid tubes to the legs of the plurality of skid joints.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to non-metallic subsea skid apparatus and associated methods, such as composite subsea valve skid apparatus and methods.

Figure 1A:
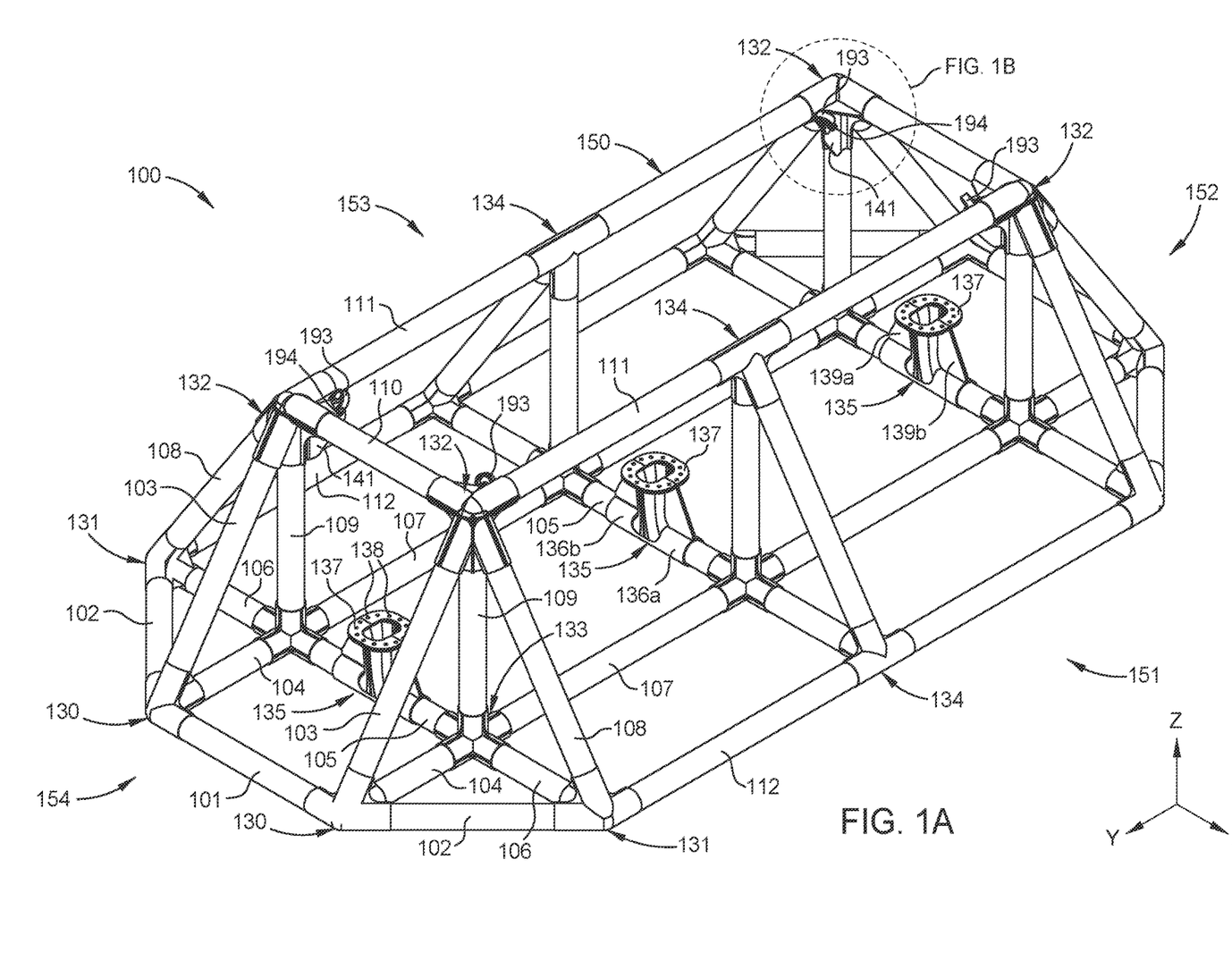
FIG. 1A is a schematic isometric view of a subsea skid, according to one implementation.

FIG. 1A is a schematic isometric view of a subsea skid 100, according to one implementation. The subsea skid 100 is a valve subsea skid. The subsea skid 100 is non-metallic. The subsea skid 100 includes a plurality of skid tubes 101-112 coupled together using a plurality of skid joints 130-135. Each of the skid tubes 101-112 and the skid joints 130-135 has one or more outer surfaces that have a smooth contour and/or a tapered finish. The subsea skid 100 shown in FIG. 1A includes fifty skid tubes 101-112 and twenty-two skid joints 130-135. The subsea skid 100 includes a plurality of padeye plates 141. Each of the padeye plates 141 is formed in a first set of skid joints 132. The first set of skid joints 132 include four skid joints 132. The plurality of padeye plates 141 are lift points for attaching lift devices, such as hoist lines or hooks of cranes, to lift the subsea skid 100. The skid joints 130-135 and the skid tubes 101-112 form a frame 150 of the subsea skid 100. The subsea skid 100 includes a first side 151, a second side 152, a third side 153, and a fourth side 154.

The subsea skid 100 tubes include vertical skid tubes 109, horizontal skid tubes 101, 104-107, 110-112, and angled skid tubes 102, 103, 108. At least some of the angled skid tubes 102 are disposed in a horizontal plane (parallel to the X-Y plane), and at least some of the angled skid tubes 103, 108 are disposed in vertical planes (parallel to the Y-Z plane for the angled skid tubes 103 and parallel to the X-Z plane for the angled tubes 108). Each of the skid joints 130-135 includes a plurality of legs protruding outward from a center of the respective skid joint 130-135. Each leg receives a portion (such as an end portion) of one of the skid tubes 101-112. The plurality of legs includes a number of legs, and the number of legs is within a range of two to five. In one example, the skid joints 130-135 include T-joints having three legs. In the implementation shown in FIG. 1A, each of the skid joints 130-134 includes four legs or five legs. The skid joints 130-135 and the skid tubes 101-112 are cured together to form the subsea skid 100. The curing occurs after the portions (such as the end portions) of the skid tubes 101-112 are disposed within the respective legs of the skid joints 130-135.

The skid joints 130-135 include a plurality of support joints 135. The support joints 135 are valve support joints. The subsea skid 100 shown includes three support joints 135. The support joints 135 are similar to the skid joints 130-134. The support joints 135 include two legs 136a, 136b. Each of the support joints 135 includes a support flange 137 formed therein for supporting equipment, such as valve equipment. Each support flange 137 includes one or more fastener openings 138 formed therein. Each support joint 135 includes flanges 139a, 139b extending between the respective legs 136a, 136b and the support flange 137. Each support flange 137 is configured to couple to equipment using one or more fasteners extending through the one or more fastener openings 138.

Each of the skid tubes 101-112 and the skid joints 130-135 is formed of a non-metallic material. The support flanges 137 and the padeye plates 141 are formed of the non-metallic material. In one embodiment, which can be combined with other embodiments, the non-metallic material is polymeric and includes one or more polymers. In one embodiment, which can be combined with other embodiments, the non-metallic material is a composite material. The composite material is a carbon composite, such as a carbon fiber material. In one embodiment, which can be combined with other embodiments, the non-metallic material includes one or more of glass fiber reinforced polymer (GFRP) and/or carbon fiber reinforced polymer (CFRP). Each of the skid tubes 101-112 and the skid joints 130-135 (such as the legs of the skid joints 130-135) includes a tube wall thickness T1 (shown in FIG. 5). The tube wall thickness T1 is within a range of 8 mm to 12 mm.

The skid tubes 101-112 and the skid joints 130-135 each include one or more tube portions that are formed of the non-metallic material. The skid tubes 101-112 each include a single tube portion. The skid joints 130-135 each include a number of tube portions that is equal to the number of legs. In one embodiment, which can be combined with other embodiments, the tube portions are formed of filament wound carbon fiber tubes.

Figure 1B:
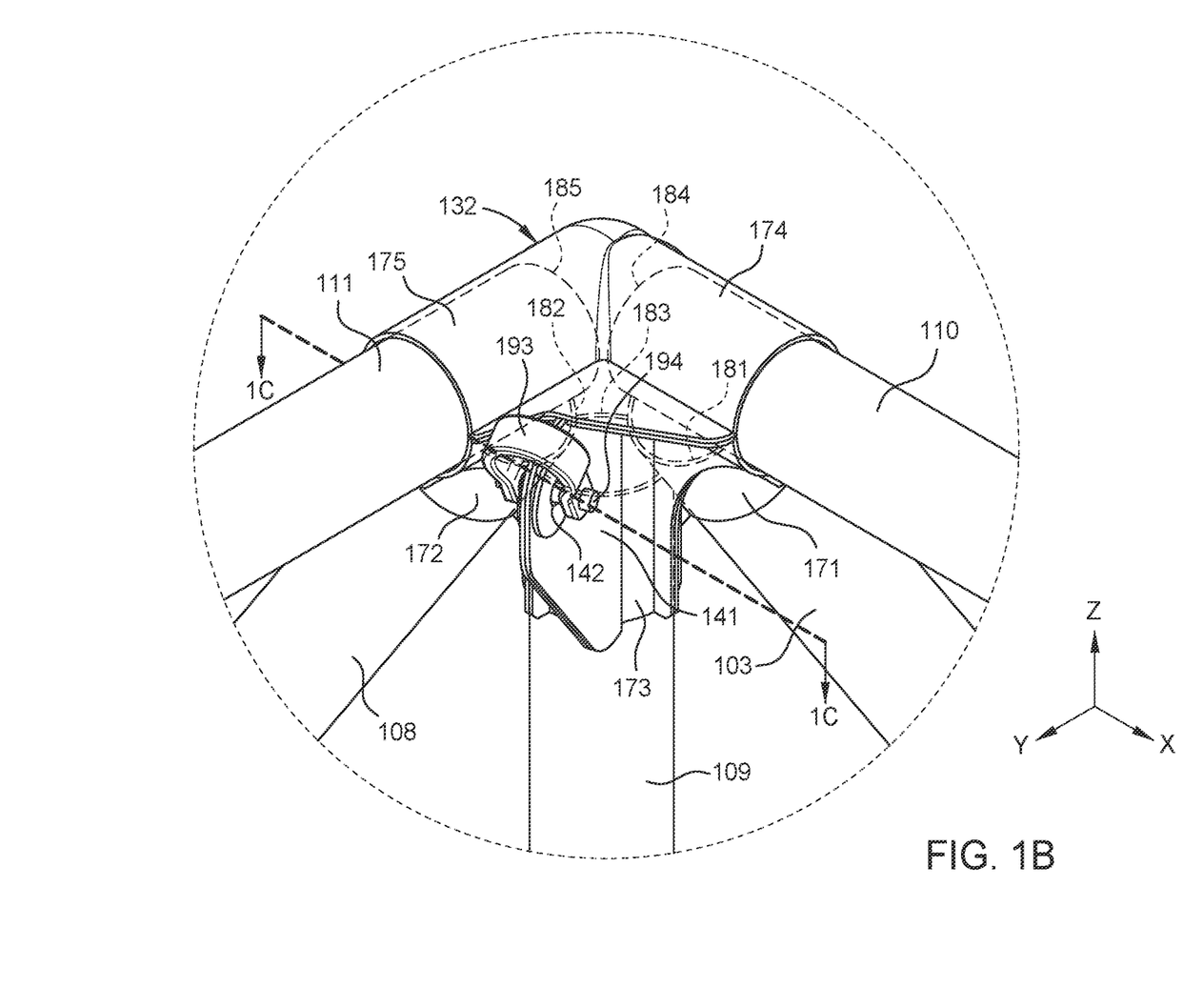
FIG. 1B is an enlarged schematic view of the subsea skid shown in FIG. 1A, according to one implementation.

FIG. 1B is an enlarged schematic view of the subsea skid 100 shown in FIG. 1A, according to one implementation. Each of the padeye plates 141 is formed on an outer surface of one of the first set of skid joints 132. Each of the padeye plates 141 includes one or more lift openings 142 formed therein. A shackle, including a shackle body 193 and a shackle pin 194, is coupled to each of the padeye plates 141. Each shackle body 193 is configured to attach to one or more lift devices used to lift the subsea skid 100.

Each of the first set of skid joints 132 includes five legs 171-175. An end portion 181-185 of each one of the respective skid tubes 103, 108-111 is disposed in a respective leg 171-175 of the respective skid joint 132. The respective end portion 181-185 is disposed in a central opening (e.g., a circular opening) of the respective leg 171-175.

Figure 1C:
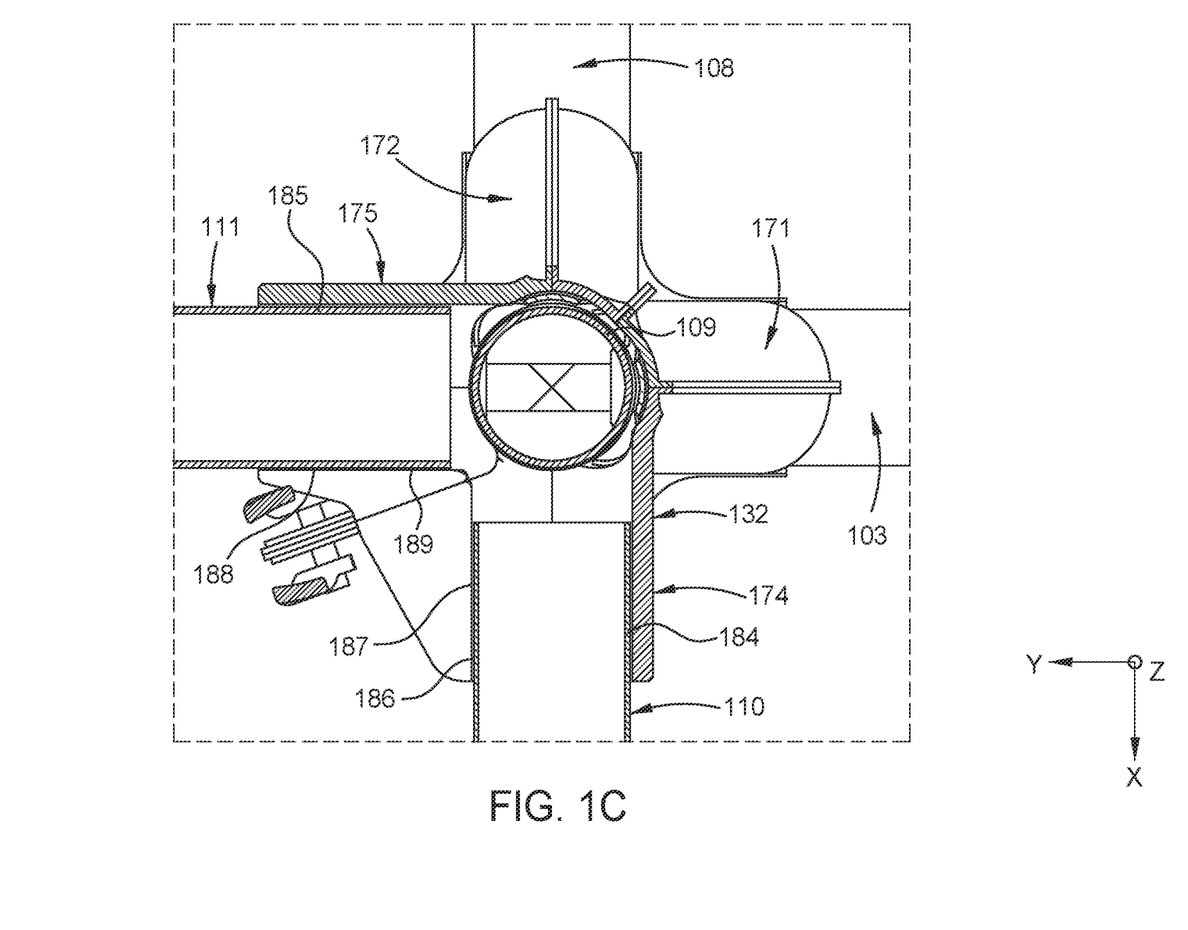
FIG. 1C is a schematic top cross-sectional view of one of the first set of skid joints shown in FIG. 1B, along Section 1C-1C, according to one implementation.

FIG. 1C is a schematic top cross-sectional view of one of the first set of skid joints 132 shown in FIG. 1B, along Section 1C-1C, according to one implementation. A circumferential outer surface of each respective end portion 181-185 is cured to a circumferential inner surface of the respective leg 171-175. A circumferential outer surface 186 is cured to a circumferential inner surface 187 of leg 174. A circumferential outer surface 188 is cured to a circumferential inner surface 189 of leg 175.

Each of the skid tubes 101-112 and the skid joints 130-135 includes a plurality of sections cured together. Each of the plurality of sections is formed of the non-metallic material. Each section of the plurality of sections includes one or more curved portions and two or more planar flange portions extending relative to the one or more curved portions.

Figure 1D:
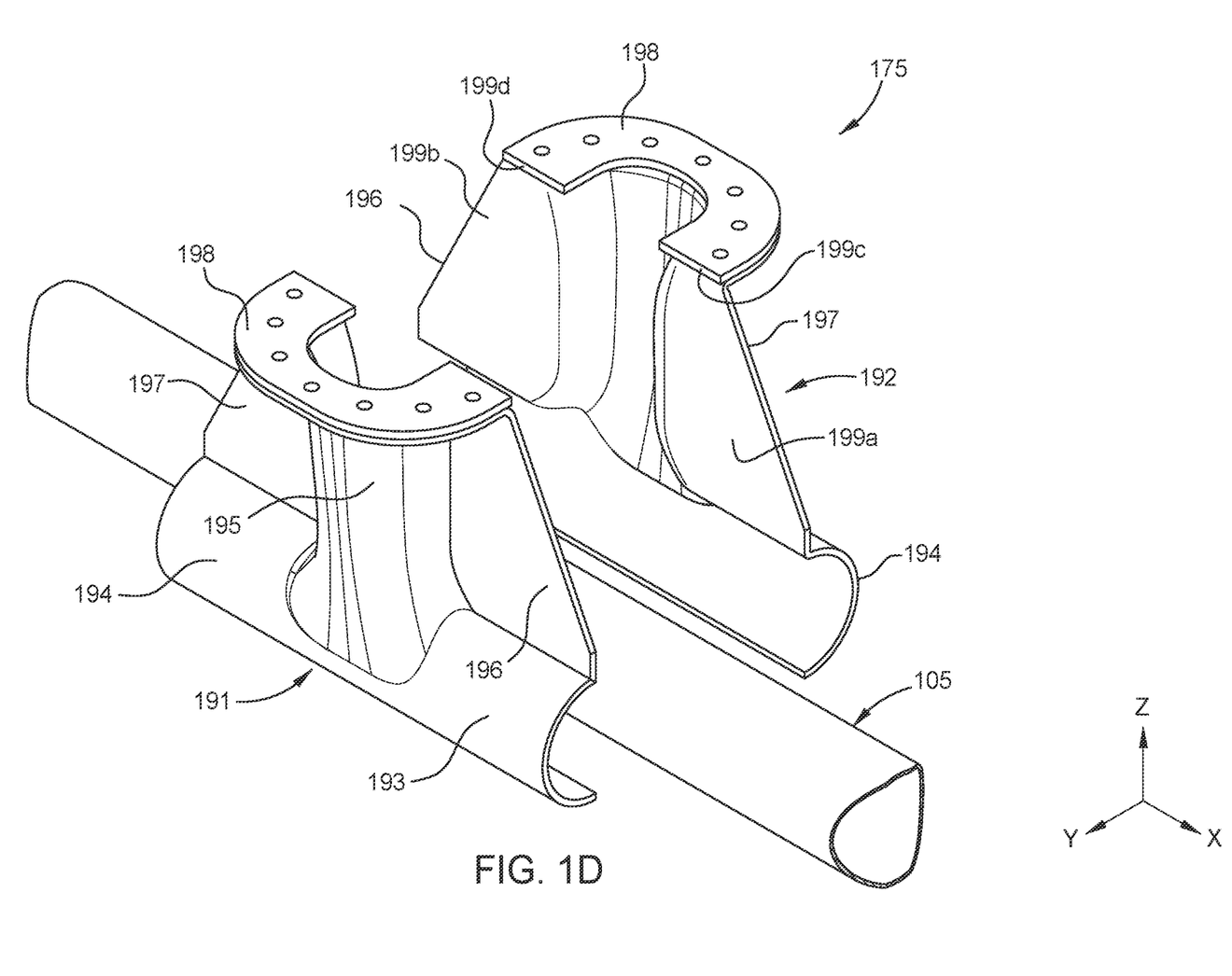
FIG. 1D is a schematic isometric exploded view of one of the support joints shown in FIG. 1A, according to one implementation.

FIG. 1D is a schematic isometric exploded view of one of the support joints 135 shown in FIG. 1A, according to one implementation. The support joint 135 includes a plurality of sections 191, 192 (two are shown) cured together to form the support joint 135. Each section 191, 192 includes one or more curved portions 193-195 (three are shown) and two or more planar flange portions 196-198 (three are shown) extending relative to the one or more curved portions 193-195. Two or more planar surfaces 199a-199d (four are shown) of the two or more planar flange portions 196-198 of the section 192 are interfaced with and cured to two or more planar surfaces 199a-199d of the two or more planar flange portions 196-198 of the section 191.

The skid tubes 101-112 can extend partially into respective legs of the skid joints 130-135 (as is shown in FIG. 1C) or the skid tubes 101-112 can extend through and past respective legs of the skid joints 130-135 (as is shown in FIG. 1D for the skid tube 105 extending through and past the curved portions 193, 194 of each of the sections 191, 192). The curved portions 193, 194 of the sections 191, 192, when cured together, form the two respective legs 136a, 136b (shown in FIG. 1A) of the support joint 135. In the implementation shown in FIG. 1D, an intermediate portion of the skid tube 105 is disposed in the two respective legs 136a, 136b of the support joint 135, and the intermediate portion is cured to the two respective legs 136a, 136b of the support joint 135. The planar flange portions 196, 197 of the sections 191, 192, when cured together, form the flanges 139a, 139b (shown in FIG. 1A) of the support joint 135. The planar flange portions 198 of the sections 191, 192, when cured together, form the support flange 137 (shown in FIG. 1A) of the support joint 135.

Figure 1E:
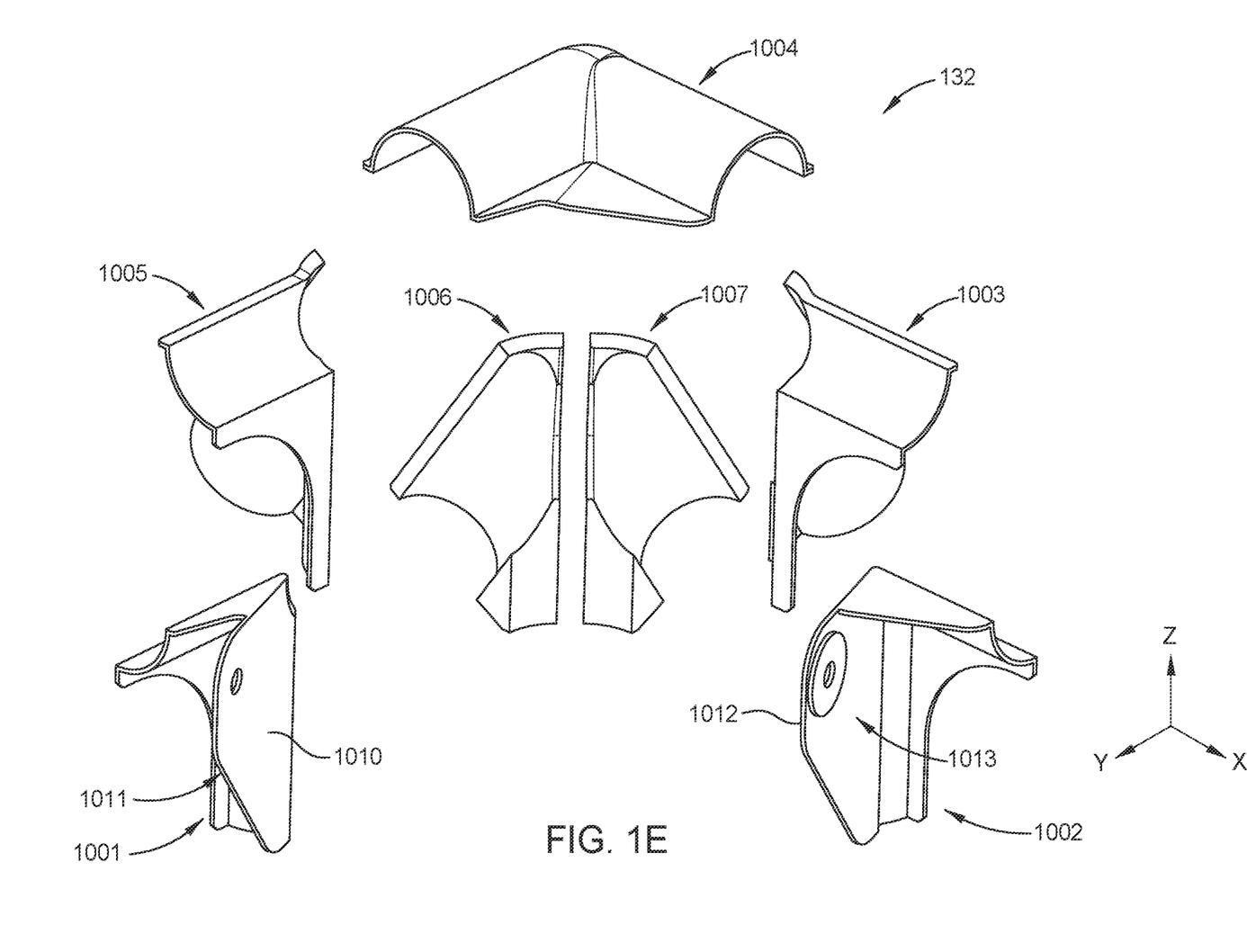
FIG. 1E is a schematic isometric exploded view of one of the skid joints shown in FIG. 1A, according to one implementation.

FIG. 1E is a schematic isometric exploded view of one of the skid joints 132 shown in FIG. 1A, according to one implementation. The skid joint 132 includes a plurality of sections 1001-1007 (seven are shown) cured together to form the skid joint 132. Each section 1001-1007 includes one or more curved portions and two or more planar flange portions extending relative to the one or more curved portions. Two or more planar surfaces of the two or more planar flange portions of each section 1001-1007 are interfaced with and cured to two or more planar surfaces of the two or more planar flange portions one or more adjacent sections 1001-1007. The curved portions and the planar flange portions of the sections 1001-1007 are cured together to form the legs 171-175 shown in FIG. 1B. A planar surface 1010 of a planar flange portion 1011 of section 1001 is interfaced with and cured to a planar surface 1012 of a planar flange portion 1013 of section 1002 to form the padeye plate 141 shown in FIG. 1B. The sections of the skid joints 130-135 (such as the sections 1001-1007) are formed prior to being cured together to form the respective skid joints 130-135. In one embodiment, which can be combined with other embodiments, the sections of the skid joints 130-135 are formed using molding, such as composite molding. Other methods of forming the sections of the skid joints 130-135 are contemplated.

Figure 2:
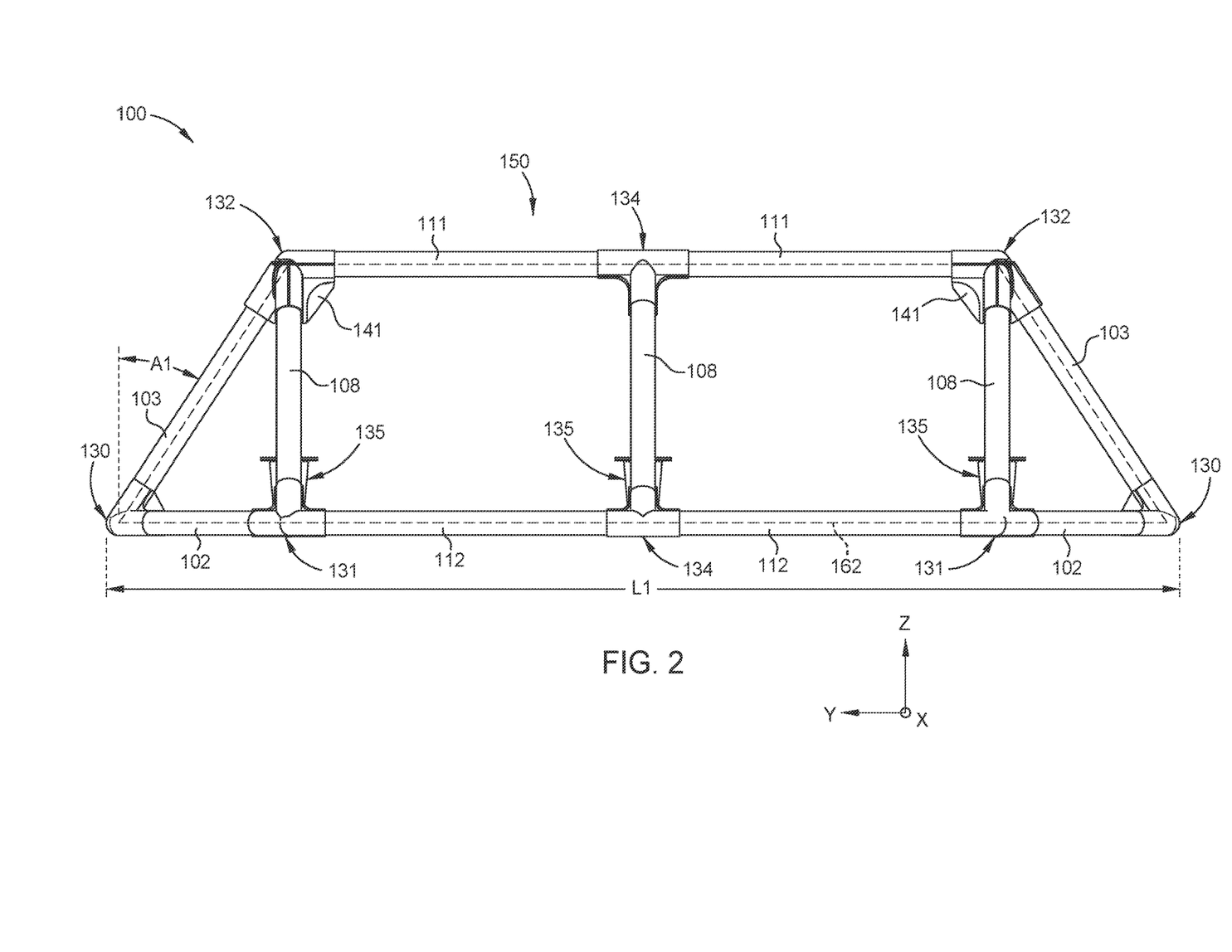
FIG. 2 is a schematic side view of the first side of the subsea skid shown in FIG. 1A, according to one implementation.

FIG. 2 is a schematic side view of the first side 151 of the subsea skid 100 shown in FIG. 1A, according to one implementation. Each of the skid tubes 103 is disposed in a plane parallel to the Y-Z plane at an oblique angle A1 relative to an axis parallel to the Z-axis. The oblique angle A1 is within a range of 30 degrees to 50 degrees, such as 33 degrees. The subsea skid 100 has a length L1 that is within a range of 450 inches to 500 inches. The frame 150 includes (from the side view of the first side 151) a trapezoidal pattern 162. The frame 150 includes the trapezoidal pattern 162 from a side view of the third side 153.

Figure 3:
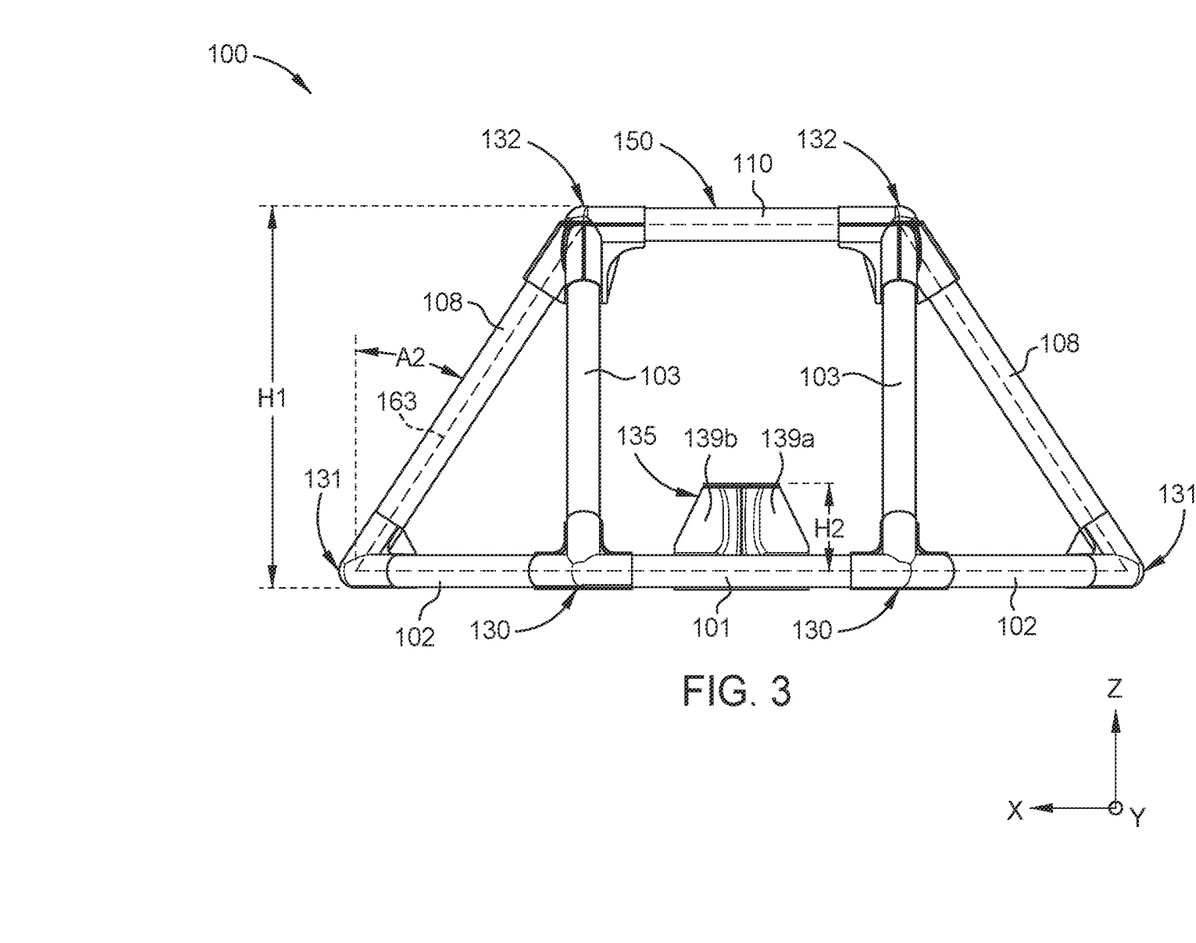
FIG. 3 is a schematic side view of the second side of the subsea skid shown in FIG. 1A, according to one implementation.

FIG. 3 is a schematic side view of the second side 152 of the subsea skid 100 shown in FIG. 1A, according to one implementation. The subsea skid 100 has a height H1 that is within a range of 115 inches to 150 inches. The frame 150 includes (from a side view of the third side 153) a trapezoidal pattern 163. The frame 150 includes the trapezoidal pattern 163 from a side view of the fourth side 154. The support joints 135 extend above central axes of the horizontal skid tubes 101, 102, 104-107, 112 by a height H2 that is within a range of 20 inches to 30 inches. Each of the skid tubes 103 is disposed in a plane parallel to the X-Z plane at an oblique angle A2 relative to an axis parallel to the Z-axis. The oblique angle A2 is within a range of 30 degrees to 50 degrees, such as 33 degrees.

Figure 4:
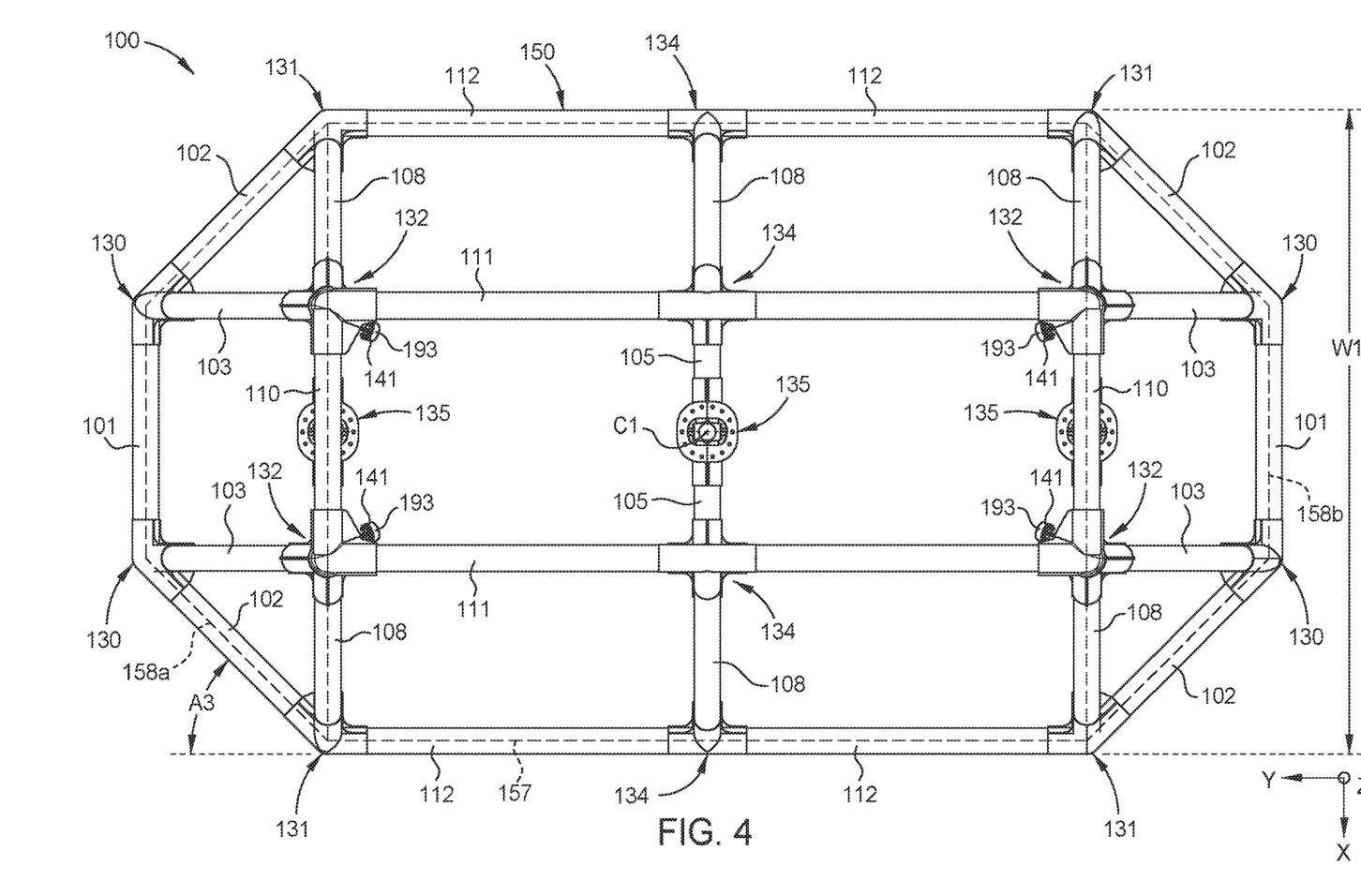
FIG. 4 is a schematic top view of the subsea skid shown in FIG. 1A, according to one implementation.

FIG. 4 is a schematic top view of the subsea skid 100 shown in FIG. 1A, according to one implementation. The subsea skid 100 has a width W1 that is within a range of 250 inches to 275 inches. The frame 150 of the subsea skid 100 includes (from the top view) a rectangular pattern 157 having four sides and four corners, and two trapezoidal patterns 158a, 158b disposed outwardly of two opposing sides of the rectangular pattern 157. The padeye plates 141 are formed on four skid joints 132 that are disposed respectively at the four corners of the rectangular pattern 157. Each of the four padeye plates 141 extends inwardly toward a center C1 of the rectangular pattern 157 from the respective corner of the four corners. Each of the skid tubes 102 is disposed in a plane parallel to the X-Y plane at an oblique angle A3 relative to an axis parallel to the Y-axis. The oblique angle A3 is within a range of 30 degrees to 50 degrees, such as 33 degrees.

Figure 5:
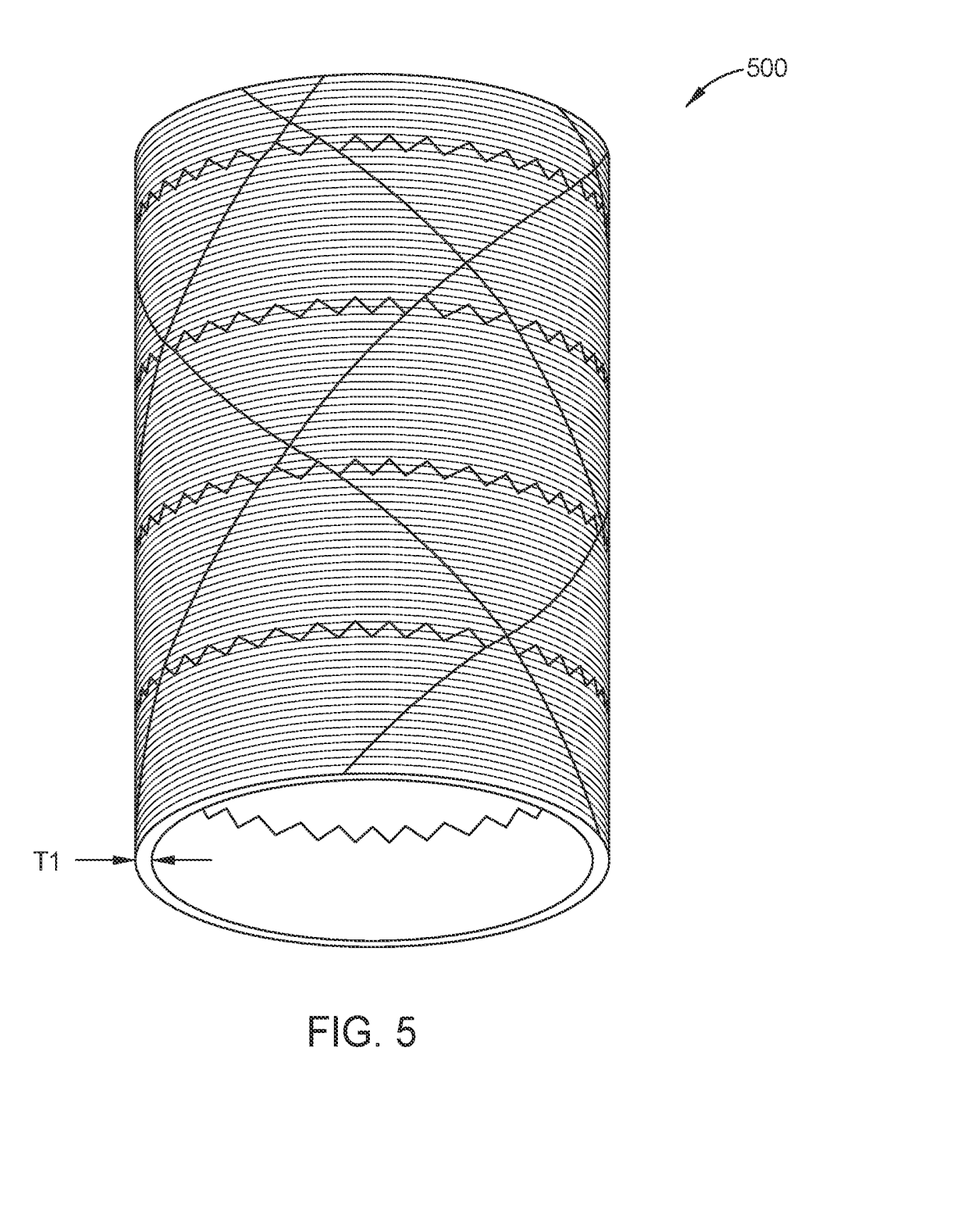
FIG. 5 is a schematic isometric view of a tube portion, according to one implementation.

FIG. 5 is a schematic isometric view of a tube portion 500, according to one implementation. The tube portion 500 can be used as the skid tubes 101-112. The present disclosure contemplates that the tube portion 500 can be used as to form tube portions of the skid joints 130-135, such as to form legs of the skid joints 130-135. The tube portion 500 is a filament wound carbon fiber tube formed of filament wound carbon fiber. The filament wound carbon fiber is wound using a layup of plies. In one embodiment, which can be combined with other embodiments, the layup of plies is wound at an angle within a range of −45 degrees to 45 degrees. In one embodiment, which can be combined with other embodiments, the layup of plies is wound at an angle within a range of −10 degrees to 10 degrees. In one example, which can be combined with other examples, the filament wound carbon fiber includes a flexural modulus that is within a range of 70 GPa to 100 GPa, such as about 80 GPa.

Figure 6:
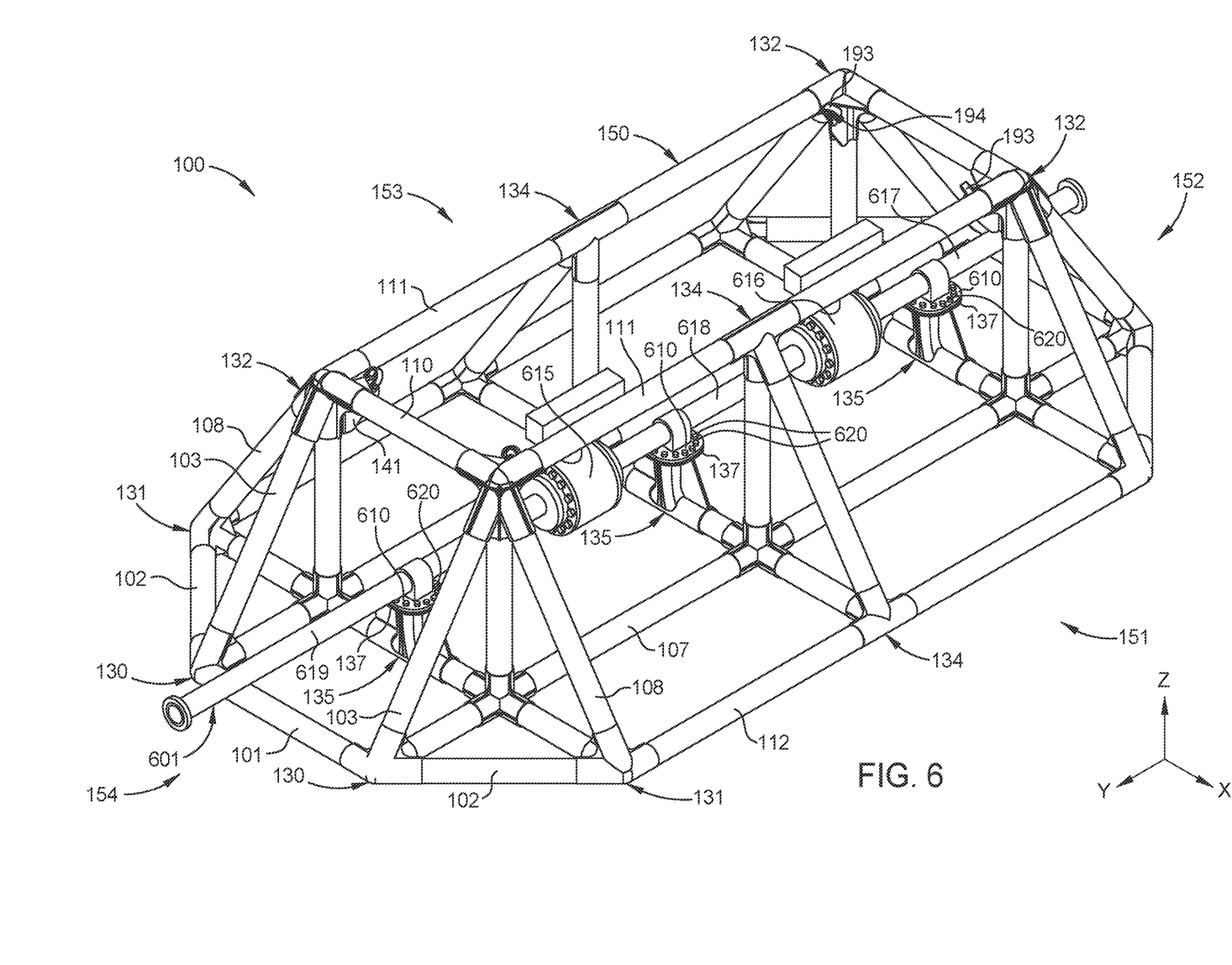
FIG. 6 is a schematic isometric view of a valve string fastened to the subsea skid, according to one implementation.

FIG. 6 is a schematic isometric view of a valve string 601 fastened to the subsea skid 100, according to one implementation. The valve string 601 includes a plurality of valves 615, 616 coupled to pipes 617, 618, 619, such as steel pipes. The valve string 601 includes a plurality of flanges 610 fastened to the support flanges 137 using a plurality of fasteners 620.

Figure 7:
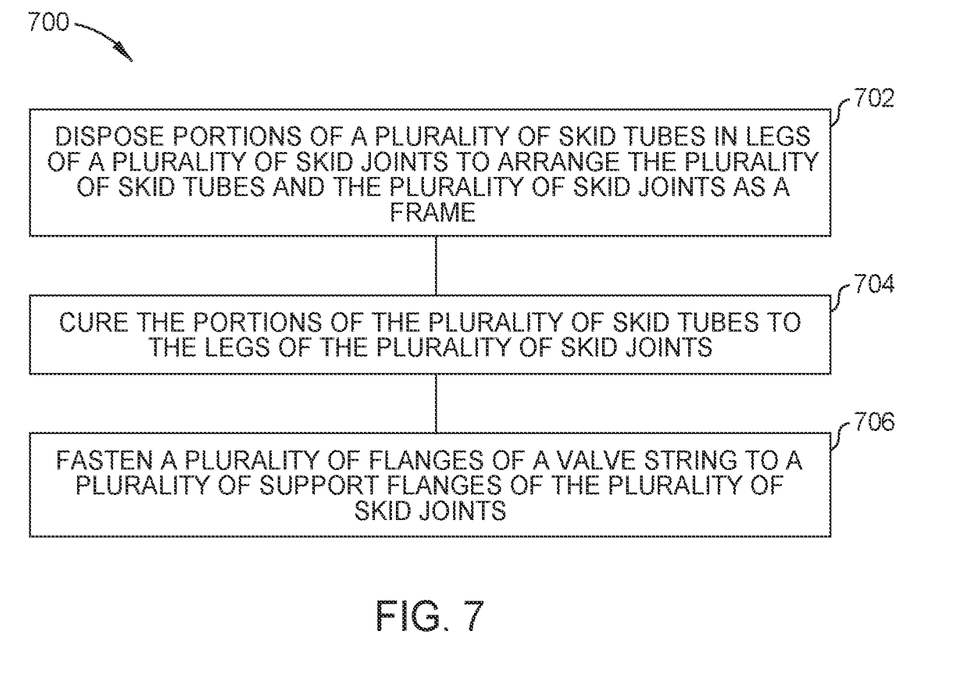
FIG. 7 is a schematic block diagram view of a method of forming a subsea skid, according to one implementation.

FIG. 7 is a schematic block diagram view of a method 700 of forming a subsea skid, according to one implementation. Operation 702 includes disposing portions of a plurality of skid tubes in legs of a plurality of skid joints to arrange the plurality of skid tubes and the plurality of skid joints as a frame. The portions are end portions and/or intermediate portions of the skid tubes. The disposing the portions of the plurality of skid tubes in legs of the plurality of skid joints can include abutting planar surfaces of sections of each skid joint against each other to form the legs of the respective skid joint. Each of the plurality of skid joints and the plurality of skid tubes is formed of a non-metallic material.

Operation 704 includes curing the portions of the plurality of skid tubes to the legs of the plurality of skid joints. In one embodiment, which can be combined with other embodiments, the curing includes heating and pressurizing the plurality of skid tubes and the plurality of skid joints in an autoclave. In one embodiment, which can be combined with other embodiments, the plurality of skid tubes and the plurality of skid joints are heated to a cure temperature within a range of 60 degrees Celsius to 120 degrees Celsius. In one embodiment, which can be combined with other embodiments, the curing occurs at an ambient temperature, such as at an offshore site. The ambient temperature is up to 45 degrees Celsius. The present disclosure contemplates that other temperatures, such as temperatures higher than the ambient temperature and the cure temperature, can be used for the curing. The curing can include using a bonding material, which can include resin, to bond the plurality of skid tubes and the plurality of skid joints together. The curing can include curing sections of each respective skid joint together. Other curing operations are contemplated.

Operation 706 includes fastening a plurality of flanges of a valve string to a plurality of support flanges of the plurality of skid joints. The present disclosure contemplates that equipment other than valve strings can be fastened to the plurality of support flanges of the plurality of skid joints.

Benefits of aspects of the present disclosure (such as the non-metallic material) include lifecycle cost savings of 25%-30% and more, longer operational lifespans for subsea skids, modularity and flexibility in design and application, reduced lead times, anti-snagging and avoiding anchor wire catching, reduced or eliminated corrosion of skids, eliminated need for cathodic protection, reduced maintenance, increased and easier (less obstructions for) access for diver operations and ROV operations, weight reductions of 70% or more for skids, and reduced carbon footprint in manufacturing and operating skids.

As an example, using the non-metallic material facilitates reduced weight and eliminated need for cathodic protection that would involve heavy sacrificial anodes. The eliminated need for cathodic protection reduces or eliminates the need for maintenance conducted on the subsea skid 100. Using the non-metallic material also facilitates the ability to use larger gaps between the skid tubes 101-112 (such as larger gaps in the rectangular pattern 157 and the trapezoidal patterns 158a, 158b) to reduce obstructions for access to components of the subsea skid 100. As another example, the non-metallic material facilitates stress performance under loading applied as a result of operational conditions, such as water pressure at deep subsea levels and loading resulting from lifting and supporting the subsea skid 100 at the padeye plates 141 to lower the subsea skid 100 to the seafloor. The non-metallic material also facilitates stress performance when an object, such as other subsea equipment, contacts the subsea skid 100. The non-metallic material, the skid joints, and the skid tubes facilitate modularity and flexibility in design and application of subsea skids.

Lifting expenditures are reduced as the lifting forces needed to lift and manipulate the subsea skid 100 are reduced. The lower lifting expenditures facilitate use of smaller offshore vessels. Using the non-metallic material, smooth contours and tapered finishes can be used on outer surfaces of the subsea skid 100 to facilitate reduced wire catching and snagging, such as reduced anchor wire snagging. For example, the contours of the curved portions and the planar flange portions of the skid joints 130-135 facilitate reduced protrusions, which facilitates reduced wire catching and snagging.

It is contemplated that one or more of the aspects disclosed herein may be combined. Moreover, it is contemplated that one or more of these aspects may include some or all of the aforementioned benefits. As an example, it is contemplated that one or more of the aspects, features, components, and/or properties of the subsea skid 100, the tube portion 500, the valve string 601, and/or the method 700 can be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A subsea skid comprising:
a plurality of skid tubes; and
a plurality of skid joints coupled between the plurality of skid tubes, the plurality of skid tubes and the plurality of skid joints forming a frame, wherein the plurality of skid tubes and the plurality of skid joints are each formed of a non-metallic material,
wherein each of the plurality of skid joints comprises two or more legs, and each of the two or more legs of each skid joint comprises a cure joint comprising bonding material disposed between a circumferential inner surface of each of the two or more legs and a circumferential outer surface located on an end portion of one of the plurality of skid tubes,
wherein a plurality of padeye plates are formed on outer surfaces of the plurality of skid joints, and
wherein the plurality of skid joints comprises a plurality of support joints, each support joint comprising a support flange formed therein, and further comprising a valve string comprising a plurality of flanges fastened to the support flange of each support joint of the plurality of support joints.

2. The subsea skid of claim 1, wherein each skid joint of the plurality of skid joints comprises a plurality of sections cured together to form the respective skid joint, and each section of the plurality of sections comprises one or more curved portions and two or more planar flange portions extending relative to the one or more curved portions.

3. The subsea skid of claim 1, wherein the plurality of skid tubes comprise a plurality of horizontal tubes, a plurality of vertical tubes, and a plurality of angled tubes.

4. The subsea skid of claim 3, wherein the frame comprises a rectangular pattern having four corners and four sides, and two trapezoidal patterns disposed outwardly of two opposing sides of the four sides of the rectangular pattern, and the plurality of padeye plates are formed on outer surfaces of four skid joints of the plurality of skid joints that are disposed, respectively, at the four corners of the rectangular pattern.

5. The subsea skid of claim 4, wherein each of the plurality of skid tubes and each of the plurality of skid joints comprises a tube wall thickness, and the tube wall thickness is within a range of 8 mm to 12 mm.

6. The subsea skid of claim 4, wherein each of the plurality of skid tubes and each of the plurality of skid joints comprises one or more tube portions, and the one or more tube portions comprise one or more filament wound carbon fiber tubes.

7. The subsea skid of claim 1, wherein the non-metallic material comprises carbon.

8. The subsea skid of claim 1, wherein the non-metallic material is a composite material.

9. The subsea skid of claim 1, wherein the non-metallic material comprises carbon fiber.

10. The subsea skid of claim 1, wherein the non-metallic material is polymeric.

11. The subsea skid of claim 1, wherein the non-metallic material comprises glass fiber reinforced polymer (GFRP) and carbon fiber reinforced polymer (CFRP).

12. A subsea skid comprising:
a plurality of skid tubes comprising a plurality of horizontal tubes, a plurality of vertical tubes, and a plurality of angled tubes; and
a plurality of skid joints coupled between the plurality of skid tubes, the plurality of skid tubes and the plurality of skid joints forming a frame, wherein the frame comprises a rectangular pattern having four corners and four sides, and two trapezoidal patterns disposed outwardly of two opposing sides of the four sides of the rectangular pattern, and a plurality of padeye plates are formed on outer surfaces of four skid joints of the plurality of skid joints that are disposed, respectively, at the four corners of the rectangular pattern, and wherein the plurality of skid tubes and the plurality of skid joints are each formed of a non-metallic material,
wherein each of the plurality of skid joints comprises two or more legs, and each of the two or more legs of each skid joint comprises a cure joint comprising bonding material disposed between a circumferential inner surface of each of the two or more legs and a circumferential outer surface located on an end portion of one of the plurality of skid tubes,
wherein each of the plurality of skid tubes and each of the plurality of skid joints comprises one or more tube portions, and the one or more tube portions comprise one or more filament wound carbon fiber tubes, and
wherein each of the one or more filament wound carbon fiber tubes comprises a layup of plies that is wound at an angle within a range of −45 degrees to 45 degrees.

13. The subsea skid of claim 12, wherein each of the one or more filament wound carbon fiber tubes comprises a layup of plies that is wound at an angle within a range of −10 degrees to 10 degrees.

14. A method of forming a subsea skid, the method comprising:
disposing a circumferential outer surface located on an end portion of one skid tube of a plurality of skid tubes in a circumferential inner surface of a leg of a plurality of legs of a plurality of skid joints to arrange the plurality of skid tubes and the plurality of skid joints as a frame, wherein a bonding agent is disposed between the circumferential inner surface of each of the plurality of legs and the circumferential outer surface located on an end portion of one of the plurality of skid tubes, and wherein each of the plurality of skid joints and the plurality of skid tubes is formed of a non-metallic material;

curing the bonding agent disposed between the circumferential inner surface of each of the plurality of legs and the circumferential outer surface located on an end portion of one of the plurality of skid tubes by heating the portions of the plurality of skid tubes and the legs of the plurality of skid joints to a temperature of 60° C. to 120° C.; and fastening a plurality of flanges of a valve string to a plurality of support flanges of the plurality of skid joints, wherein each of the plurality of skid tubes and each of the plurality of skid joints comprises one or more tube portions, and the one or more tube portions comprise one or more filament wound carbon fiber tubes.

\* \* \* \* \*